United States Patent Office 3,585,678
Patented June 22, 1971

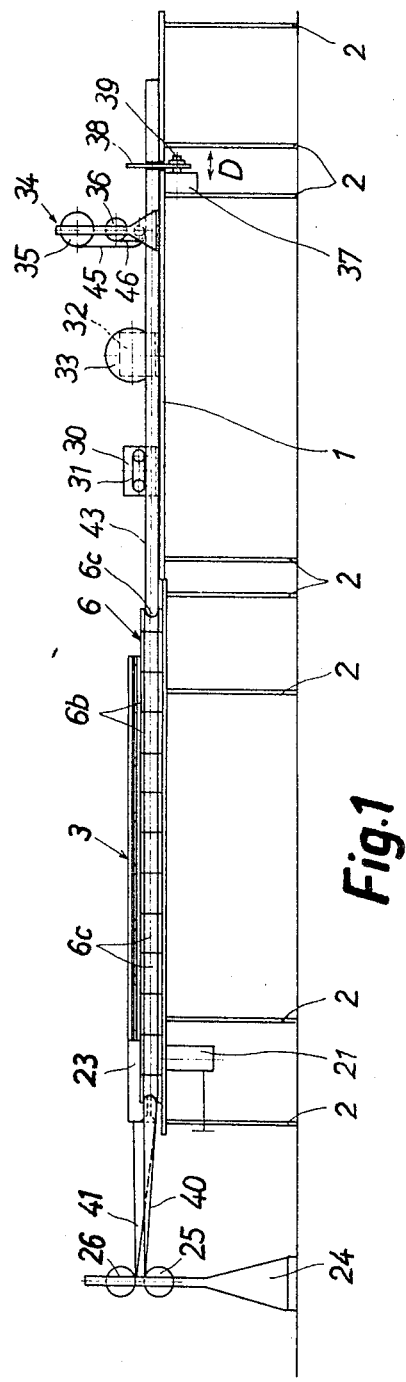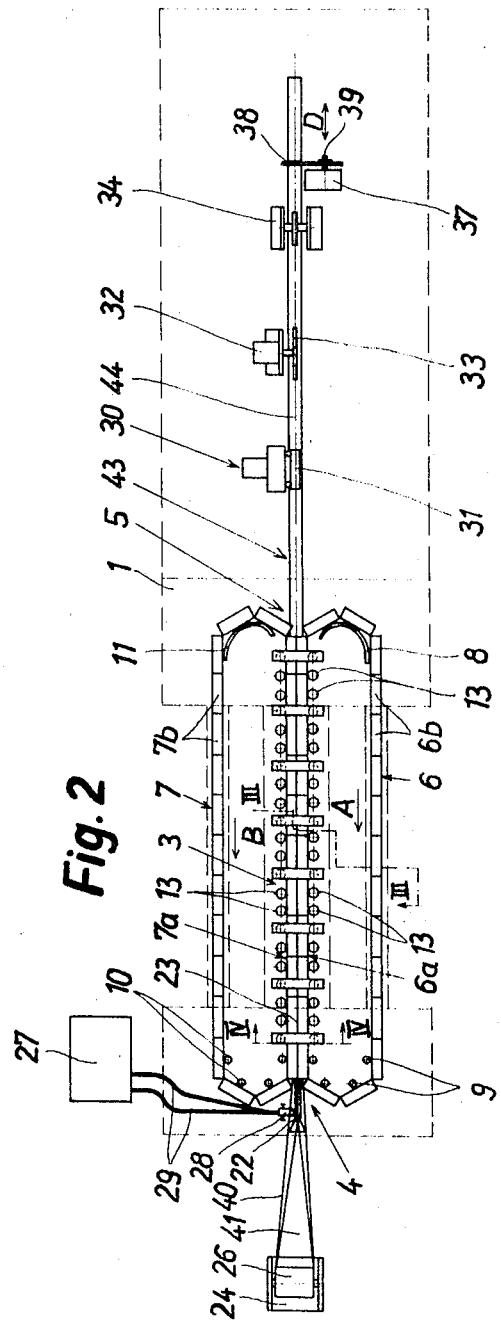

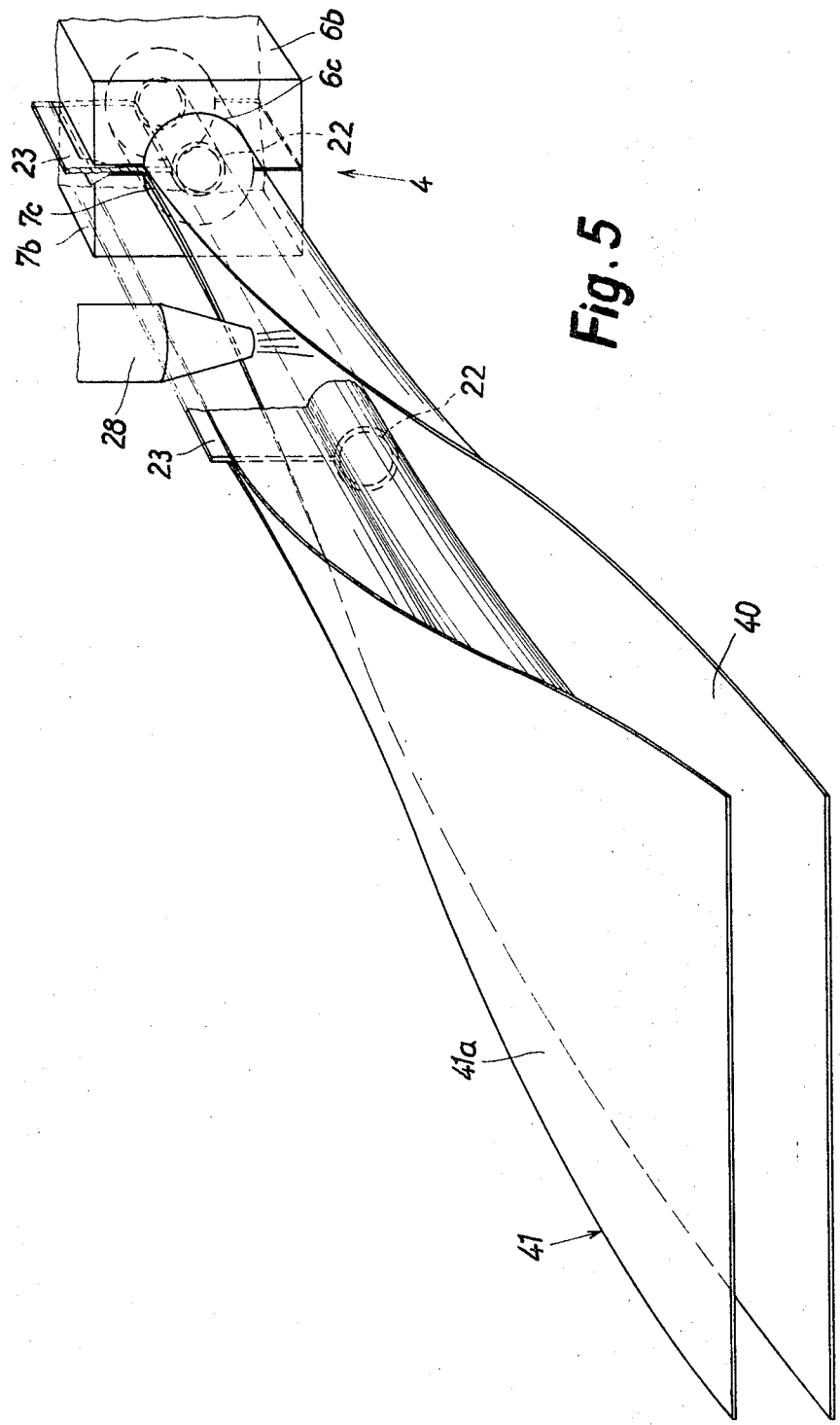

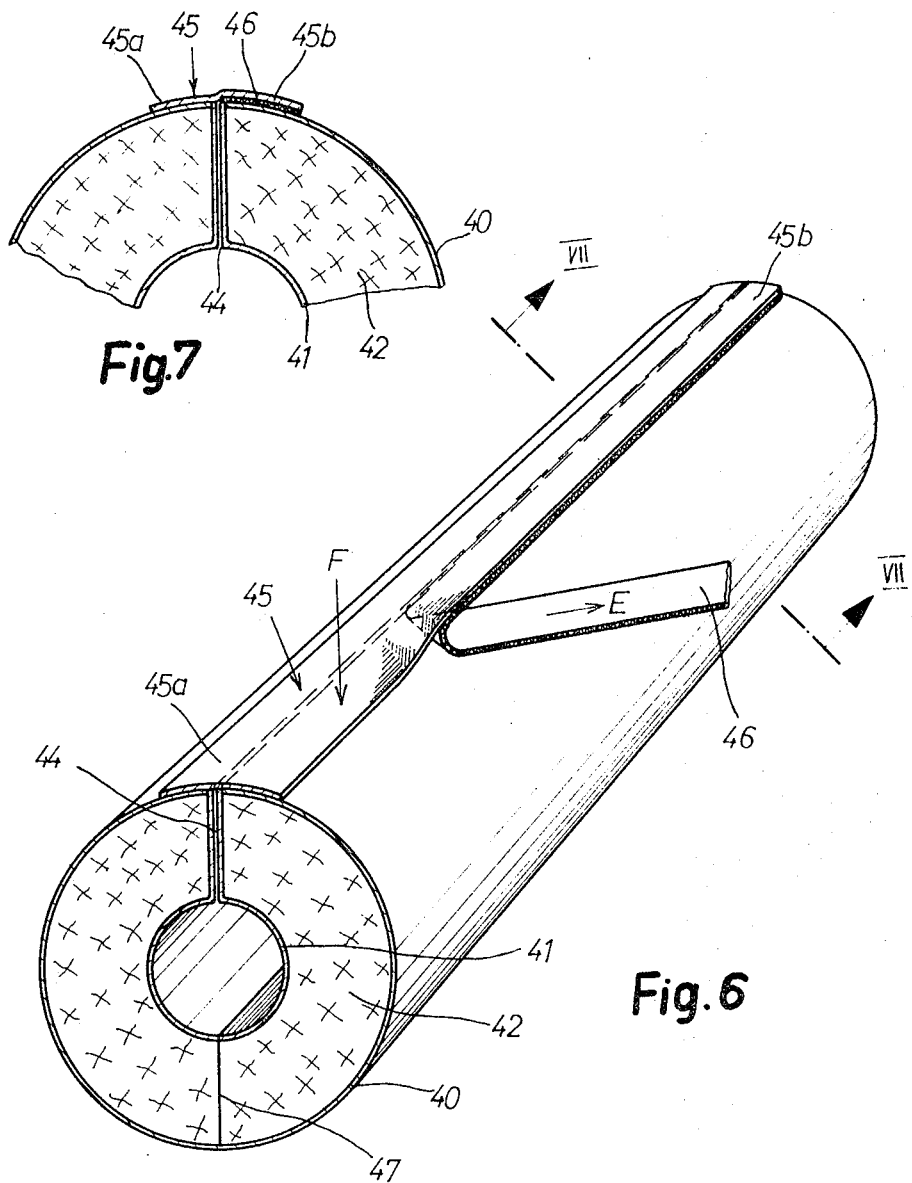

3,585,678
**APPARATUS FOR MANUFACTURING LONGI-
TUDINALLY SPLIT FOAM INSULATING
TUBES**
Peter Neumann, Fichtenweg 7, Buchs, St. Gallen, Switzerland, and Horst Roland Strobl, 8 Sudliche Munchner Strasse, 8022 Grunwald, near Munich, Germany
Filed Nov. 20, 1967, Ser. No. 684,284
Claims priority, application Germany, Nov. 21, 1966,
N 29,534
Int. Cl. B29c 1/00
U.S. Cl. 18—4                    5 Claims

ABSTRACT OF THE DISCLOSURE

A method and apparatus for producing foam insulating tubes having a longitudinal slit where there is provided a fixed inner mold core and a moving outer mold. A foil member surrounds the inner core and a second foil member is aligned with the inside of the outer mold. The foam material is then continuously foamed in place as the foil members and the outer molds advance. A foam insulating tube having a longitudinal slit, a foil outer covering, a foil inner surface and a foil covering on the surfaces of said slit.

---

Today foam insulating tubes are often used as heat insulation for heating or cooling duct systems. They are produced singly in molds which have a core for tube formation. After their production they are slit lengthwise so that they can be slipped on the ducts to be insulated from the exterior. Since foam is very sensitive to impacts and environmental influences, the insulating tubes are wrapped with protective foils after their application on the ducts. For this purpose shell type foils are known already with closures applied thereon, which are simply wrapped around the insulating tube and then closed. The production as well as the use of the known foam insulating tubes are complicated. The individual production of the tubes and the subsequent slitting result in a time-consuming and uneconomical operation. The wrapping of the insulating tubes after their application on the ducts again requires much time and, where installation conditions are crowded, also great skill. Moreover, the known foam insulating tubes are not protected against damage to their inner faces when being slipped onto the duct systems which are often rough and have projections and sharp edges at the joints and points of attachment.

It is the object of the invention to simplify the production and use of foam insulating tubes and at the same time to provide more resistant foam insulating tubes.

In the prior art a process is known for the production of foam insulating tubes (DAS—German provisional patent—1,175,423) where the foam insulating tube is produced continuously. For this purpose, reactive foam base material is applied on a flat, endless support strip not adhering to the foam, which shortly after the point of application enters a tubularly arched sheetmetal mold shell and consequently becomes tubularly arched too. Coaxially with the strip and the sheetmetal molding shell there is passed through the latter a material extrusion to be wrapped with the foam.

Additionally wrapping foil may be placed on the support strip before application of the foam base material. The foam base material foams out in the tubular zone of the support strip and in so doing envelopes the material extrusion to be insulated. At the end of the sheetmetal mold shell the support strip resumes its flat form, whereby the foam extrusion surrounding the material extrusion and itself enclosed by the wrapping foil is stripped from the mold. This method is excellently suited for insulating electric wires, where the thickness of the insulating layer is small. If one were to try to produce in this way thicker foam insulating bodies, the internal pressure acting on the support strip during the foaming out in the region of the sheetmetal mold shell would press against the inner wall of the sheetmetal mold shell so strongly that it would no longer be possible to move the support strip. Besides, this known method is of course unsuitable where hollow foam insulating tubes are to be produced, which are applied only subsequently on ducts already installed. The material extrusion to be enveloped can no longer be removed from the foam insulation in the known method so that, when applied to duct systems, the tubes would, in the known method, have to be first insulated and then installed, which as a rule is impossible.

Also there is known already a method for the continuous production of foam bodies which are enclosed on all sides in wrapping foils. In this process two wrapping foils are drawn off from foil rolls in spaced relation. Into the interstice a reactive foam base material is filled. The web thus formed is then introduced between opposite strands of endless mold plate chains. Here the material foams up and foams a foam body of closed cross-section lying between the wrapping foils. Of these, one may be folded up on both sides to form a lateral seal. While plates, foils or rods of wrapped foam can be produced with this known method, it is not possible to produce foam insulating tubes. There is, in fact no possibility of keeping free a tubular cavity in the interior of the foam body (German Patent 859,122).

The same is true of another known method (DAS 1,154,264) where the foam material and the foil-forming wrapping material are extruded from a common extruder head and are introduced in a mold channel. This also produces only shaped foam bodies with full cross-section surrounded by a wrapping foil. Apart from this, because of the simultaneous production of the foam body and of the wrapping, this method is extremely complicated in terms of machinery.

Recently, therefore, a method has become known for the continuous production of foam bodies (DAS 1,202,-476) with which hollow foam bodies, in particular foam insulating tubes, can be produced. In this method, the foam base material is applied on a rotating and simultaneously longitudinally moved core body and can foam up freely outwardly. Here, therefore, the production method customary for foam bodies of full cross sections, which uses more or less closed mold channels has been abandoned. This new method, however, has the disadvantage that the simultaneous rotating and lengthwise moving of the core body requires a complicated machine. Another disadvantage is that after the foaming-out of the foam the core body must be detached from the foam body, so that an additional operation is required. This is so even if the rotation of the core body is effected only over a certain angle zone, so as to leave free a longitudinal slot in the tubular foam body. Finally this method also has the disadvantage that the outward foaming is not restricted to a certain limit, so that the foam insulating tubes thus produced have an irregular outer surface. Moreover, when being installed, the foam tubes must be covered specially with a wrapping foil, as has been described above for the singly poured foam insulating tubes. At any rate, the last described process shows that it was obviously regarded as impossible to produce foam insulating tubes in mold channels closed on all sides.

The above stated problem is solved according to the present invention in that there are introduced into an annular mold channel, whose outer wall is moved in the longitudinal direction of the channel and whose inner wall is formed by a fixed core carried by a radial holding plate, a wrapping foil applied against the inside of the outer wall and a core foil applied against the core and the holding plate, which are both drawn off the foil rolls continuously in plane form and are arched tubularly by the penetration into the mold channel. Shortly before the entrance of the foils into the mold channel reactive foam base material is filled into the wrapping foil, which foams out in the mold channel and bonds with the two foils.

The method according to the invention operates with a mold channel which possesses a movable outer wall and a fixed core. The use of a fixed core, indispensable for tube production, is rendered possible in the process of the invention by the fact that the fixed core is separated from the traveling foam by a co-traveling core foil, so that no insurmountable friction occurs. Technologically the provision of a fixed core in the otherwise traveling mold channel becomes possible in the invention by the fact that the tube is produced in the slit state from the start, so that a holding plate carrying the core can engage radially into the mold channel. The process of the invention leads directly to a longitudinally slit foam insulating tube which is covered by a foil both on the outside and on its inner faces. In many cases this tube can be used directly for insulating purposes without any after treatment and is well protected externally and internally against damage. In particular no subsequent wrapping of the foam insulating tube at the site of installation is required any more. The continuous production method for foam insulating tubes according to the invention considerably simplifies the production and lowers the cost thereof; it can be carried out in a relatively simple apparatus and leads to a foam insulating tube which is mechanically better protected than before and can be installed easily and quickly.

With the process according to the invention difficulties arise when foam insulating tubes of greater wall thickness are to be produced. The pressure occuring during foaming up then presses the core foil against the fixed core and holding plate with such great force that the friction can no longer be overcome readily. The invention circumvents these difficulties in that there is used as core foil a foil coated on the side toward the core and the holding plate with a substance, for example wax, silicone, or thermoplastic, which melts at the reaction temperature of the foam base material, or which has sliding properties. The softening and melting coating of the core foil or of the sliding substance acts as lubricant which reduces the friction between the core foil and the core as well as the holding plate to such an extent that the resulting foam insulating tube can be moved through the mold channel.

With foam insulating tubes of greater wall thickness it may happen that the longitudinal slit traversing only one wall thickness is not sufficient for the foam insulating tube to be spread apart far enough to be able to slip it on a duct from the side. To overcome this problem such tubes are overexpanded during installation or must be provided with an additional longitudinal slit by hand. An advantageous development of the invention described herein provides that in the mold channel or after leaving it the foam insulating tube is provided continuously with an additional longitudinal slit which is in alignment with the longitudinal slit formed by the holding plate.

A very important development of the process of the invention consists in that there is glued onto the foam insulating tube, after it leaves the mold channel, in the region of the longitudinal slit formed by the holding plate, an adhesive strip covering the latter which on one side of the longitudinal slit adheres to the wrapping foil, while on the other side is separated from the wrapping foil by a pull-off strip not adhering thereto. After the application of the foam insulating tube on the duct to be insulated, the insulation is in this case closed simply by detaching the pull-off strip and pressing the thus exposed adhesive surface of the closing strip against the insulating tube. This operation can be carried out much faster and is simpler than the conventional sheeting of the foam insulating tubes with wraps provided with closing means. Moreover, this method of closing is much cheaper as it requires no additional structural parts besides the adhesive strip.

The invention also provides an apparatus for making foam insulating tubes. It is characterized by an annular mold channel whose outer wall is formed by directly adjacent strands of a pair of drivable, endless mold block chains, the form blocks of which present recesses supplementing each other to form the mold channel cross-section, and the inner wall is formed by a fixed core attached to a holding plate radially projecting between the adjacent strands of the mold block chains. A frame for foil rolls is provided ahead of the mold channel, and a feed device for foam base material with a mouthpiece is provided near the mold channel entrance.

In the apparatus according to the invention, the mold channel is not, as was customary heretofore, limited by endless belts which by their backs take support on fixed slideways. Instead, the outer contour of the mold channel is formed by mold blocks which are joined together like chains and revolve. The strands of the mold block chains forming the mold channel, of course, are supported on their backs by supporting rolls which absorb the radial pressure caused in foaming up. Externally the mold channel is limited only by two opposite mold blocks which contain recesses corresponding to the mold channel cross-section. These blocks can be compressed strongly so that problems of tightness do not arise. The tight compressing of the mold block chains is possible under the invention despite the projection of the holding plate between the opposite mold blocks. The core foil, in fact, coated with a thermoplastic or other lubricating material can be made so wide that it extends also over the portion of the holding plate present directly between the mold blocks, so that at this point no insurmountable friction occurs either. The projecting marginal parts of the core foil can be trimmed off continuously behind the mold channel. With the formation of a closed mold channel by means of four plate belts, as it is known, unsurmountable tightness problems do occur. In the apparatus according to the invention, the wrapping foil fits very well into the mold channel between the mold blocks because it is pressed against the inner walls of the mold channel by the expanding foam material. The use of two mold block chains renders possible moreover the introduction of a holding plate for the core into the mold channel. A mold channel formed by two mold block chains with supported working strands may be used not only for the production of foam tubes but generally for the continuous production of foil-wrapped foam extrusions. For this it suffices to omit the core of the apparatus according to the invention.

If the foam insulating tube is to be provided with a second longitudinal slit in addition to the longitudinal slit formed by the holding plate, a longitudinally slitting device is provided aligned with the holding plate, for example a circular saw, arranged behind the outlet of the mold channel. The slitting device engages through the longitudinal slit formed by the holding plate and slits the opposite tube wall from the inside. In this way, longitudinal slits of any adjustable depth can readily be produced.

For the same purpose, the holding plate may, in a mechanically simpler manner, be extended in radial direction beyond the core. The extension piece of the holding plate beyond the core forms an additional longitudinal slit during foaming. The depth, however, is not variable without changing the core construction.

Behind the outlet of the mold channel, a closing strip applicator is advantageously arranged.

The invention also includes the longitudinally slit foam insulating tube itself which is characterized in that the foam forming the tube wall is covered externally by a wrapping foil firmly bonded with it and internally as well as at least partly at the side of the longitudinal slit by a core foil likewise firmly bonded with it. Such a foam insulating tube is distinguished from the known foam insulating tubes, which in the crude state are not wrapped at all, in that all surfaces are protected against mechanical damage and environment influences. If necessary, such foam insulating tubes according to the present invention may also be poured singly in molds with cores into which foils have previously been placed. This affords the advantage that when installing the foam insulating tubes, an additional wrapping operation is no longer necessary and moreover the otherwise never provided foil protection layer on the inside of the insulating tube is present.

Also with singly produced foam insulating tubes according to the invention it is of course possible to glue on the outside of the tube along the longitudinal slit a sealing strip which adheres to the tube only on one side of the slit, while on the other side it is covered by a pull-off strip not adhering to the tube. Also in this case it suffices for the perfect closing of the foam insulating tube after installation to pull off the pull-off strip and to press the sealing against the outer face of the tube.

The invention will be explained in greater detail below with reference to the drawings which represents the production of an insulating tube according to the present invention and in which:

FIG. 1 shows a side view of an apparatus for the continuous production of foam insulating tubes according to the present invention;

FIG. 2 is a top view of the device according to FIG. 1;

FIG. 5 is a perspective representation of the entrance zone of the mold channel of the apparatus according to FIGS. 1 and 2;

FIG. 6 is a perspective representation of a section of a foam insulating tube produced with the apparatus according to FIGS. 1 to 5; and FIG. 7 is a partial section through the tube according to FIG. 6 along line VII—VII of FIG. 6.

Figure 3:
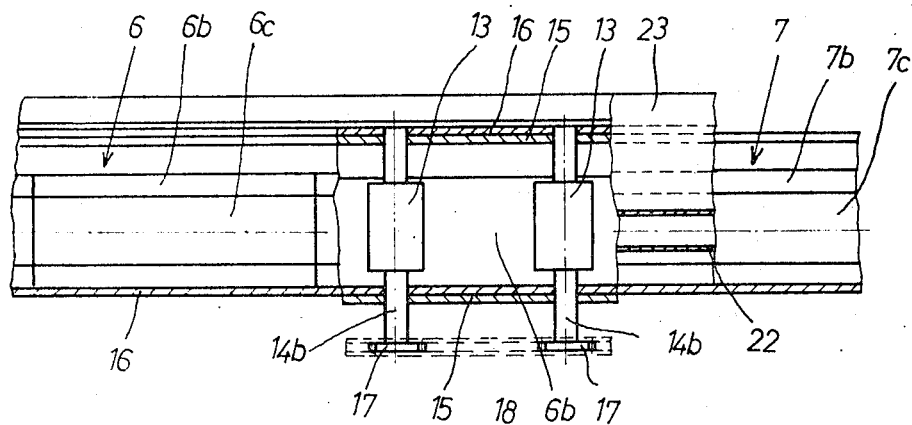
FIG. 3 is a partial lateral sectional view of the device according to FIGS. 1 and 2 along line III—III of FIG. 2.

On a base plate 1, whose contour lines are indicated in broken lines in FIG. 2 and which rests on supports 2, is arranged a mold channel 3 having an entrance zone 4 and an exit zone 5. The mold channel 3 is formed by directly adjacent strands 6a and 7a of two mold block chains 6 and 7. Each of the mold block chains consists of mold block 6b, 7b articulatedly fitted together, which are guided around guide members 8, 9, 10 and 11 in a plane on a closed path for each in the form of an elongated oval. The mold blocks may be made of plastic or metal, preferably of light metal. They contain sectional recesses 6c, 7c (see also FIG. 4) which supplement one another in the adjacent working strands 6a and 7a to form a substantially closed cross section of, for example, circular shape. The mold block chains are driven in opposite directions as indicated by the arrows A and B in FIG. 2, so that the working strands 6a and 7a parallel each other and move in the same direction. The drive of the mold block chains 6 and 7 is effected by supporting rolls 13 which are arranged on both sides of the working strands 6a and 7a and hold the mold blocks 6b and 7b together in the zone of the mold channel 3. By means of journals 14a and 14b, the supporting rolls 13 are mounted in a carrying construction formed by four angle rails 15 (FIG. 4), which in turn takes support on the base plate 1 in a manner not shown. The upper angle rails 15 are connected together at certain distances by straps 16. The lower angle rails 15 are in connection by a slide plate 16, on which run the working strands 6a and 7a of the mold block chains 6 and 7. To the lower journals 14b of the supporting rolls 13 chain pinions 17 are fastened. These chain pinions 17 are driven through a chain 18 from a main chain wheel 19, which in turn is mounted on the shaft 20 of the driving motor 21. In this way the synchronous rotation of the mold block chains 6, 7 as well as the cohesion of the mold blocks in the zone of the mold channel 3 is insured.

The outer wall of the mold channel 3 is delimited by the recesses 6c, 7c of the mold blocks 6b, 7b. As the mold channel for the production of a tube must be annular an inner wall is provided. As is particularly shown in FIG. 4, the inner wall is formed by a tubular core 22. Core 22 is carried by a holding plate 23 which extends radially into the mold channel and which is connected with the carrying construction 15, 16. Unlike the mold block chains 6, 7, therefore, the core 22 and the holding plate 23 are fixed. The core 22 with the holding plate 23 projects a little forward out of the inlet of the mold channel 3, as can be clearly seen from FIGS. 2 and 5.

Core 2 is arranged concentric with the profile walls 6c, 7c and is spaced from them a distance which substantially corresponds to the desired thickness of the foam insulating tube to be produced.

At a distance before the inlet 4 of the mold channel 3 there is arranged a foil roll frame 24 which carries two foil rolls 25 and 26 one above the other.

Further a foam producing unit 27 is provided, which supplies a mouthpiece 28 located just before the inlet 4 of the mold channel 3 with reactive foam base material. If a two-component base is concerned, then the unit 27 is connected with the mouthpiece 28 by two lines 29 for the two components, which come together only in a mixing chamber immediately preceding the mouthpiece.

Behind the outlet 5 of the mold channel 3, a cutting unit 30 is placed on the base plate, which has a revolving cutting chain 31.

The cutting unit 30 is followed by a lengthwise slitting device 32, which in the example shown is a circular saw with a sawblade 33A closing strip applicator 34 follows the sawblade from which can be drawn off a closing adhesive strip from a roll 35 and a pull-off strip from a roll 36. Lastly there is provided a severing device 37, again designed as circular saw with a sawblade 38. The sawblade 38 is mounted on a shaft 39 which can be moved back and forth a short distance in the direction of the double arrow D.

With the apparatus described thus far, a foam insulating tube is produced in the following manner:

From the foil roll 25 a wrapping foil 40 is pulled off in a level state. This wrapping foil is to serve as protective wrap for the foam insulating tube to be produced and therefore must possess good mechanical strength properties. A PVC hard foil is preferred, but foils of improved paper, metal, especially aluminum fabrics and other foil-forming plastics can be used. The wrapping foil 40 is introduced into the inlet end 4 of the mold channel so that it is applied agaist the inside of the outer walls 6c, 7c . . . . The width of the wrapping foil 40 coincides with the outer circumference of the tubular mold channel.

FIG. 5 shows the wrapping foil 40 on entering the mold channel arches first into a through-shaped and finally into the form of a tube.

At the same time a core foil 41 is pulled from the foil roll 26, at first in a level state. The core foil 41 may consist of the same materials as stated for the wrapping foil 40. On the upper side, marked 41a in FIG. 5, the core foil 41 has a coating consisting of heat-sensitive material. For this there may be used, for example, waxes, thermoplastic resin, silicone, or other substance which soften or liquefy at the reaction temperature of the foam used for the tube protection. The coating may consist also of a dry lubricant, for example on a base of graphite or molybdenum. On entering the mold channel 3, the core foil 41 orients with the coated surface 41a against the core 22 and the separating plate 23. Its dimensions are such that it covers the core completely and the separating plate at least as far as the latter immerses between the mold blocks 6b and 7b facing each other. FIG. 5 shows that the core foil 41 changes from the level state to a trough-like shape and to the final position. The latter is clearly evident from FIG. 4 for the core foil as well as for the wrapping foil.

Figure 4:
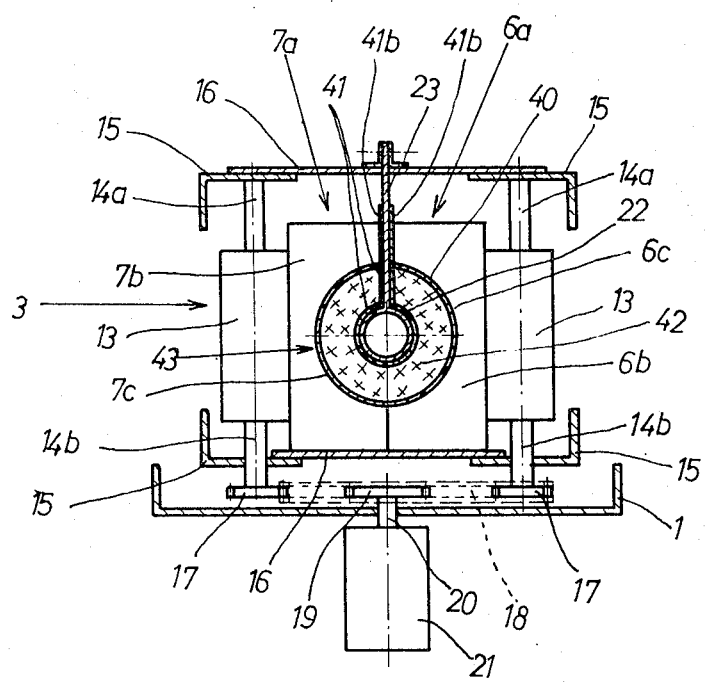
FIG. 4 is a vertical section through the mold channel of the apparatus along line IV—IV in FIG. 2.

Shortly before the inlet end 4 of the mold channel 3, there is introduced into the wrapping foil 40, which is trough-shaped at that point, a reactive foam base material from the mouthpiece 28. Preferably a polyurethane foam is used. But also phenol resin, PVC, and other synthetic resin foams may be used. Also latex foam may be used. The foam base material starts to react immediately after leaving the mouthpiece 28 and forms between the wrapping foil 40 and the core foil 41 a tubular foam body 42 (FIG. 4). The outward and inward expansion of the foam is limited by the profile recesses 6c, 7c of the mold blocks 6b and 7b and by the core 22 and the holding plate 23. The expanding foam presses the wrapping foil 40 firmly against the inner walls of the recesses 6c, 7c and the core foil 41 equally firmly against the outer face of the core 22 and the holding plate 23. The pressure occurring between the mold blocks 6a, 7a and the wrapping foil 40 is absorbed at the supporting rolls 13 and renders it possible to entrain by the movement of the mold block chains 6, 7 the foil wrapped foam body 42 obtained in the form of an extrusion 43 (FIGS. 1, 2). The extrusion 43 is thus formed continuously from the foils 40, 41 and the foam 42.

When using polyurethane foam, the reaction in the mold channel is exothermal. When using other foams, it may be necessary to heat the mold channel. Due to the reaction heat, the coating on the surface 41a of the core foil 41 melts, so as to form a lubricant layer between the core foil and the fixed core 22 and the holding plate 23. The core and the holding plate thus do not offer an insurmountable frictional resistance to the extrusion 43 running along them and to the mold blocks 6b, 7b pressed against the holding plate.

As is shown in FIG. 4, there extends upwardly from the extrusion body 43 two strip-shaped flaps 41b, which would interfere with its use as foam insulating tube. These flaps are cut off continuously by the cutting unit 30 after the outlet end 5 of the mold channel 3.

Aftetr leaving the mold channel, the extrusion body 43 presents a longitudinal slit 44, which is attributable to the holding plate 23. To be able to close this slit when using the extrusion as insulating tube, the existing slit 4 is deepened beyond the cavity formed by the core 22 by the sawblade 33 of the longitudinal slitting unit 32. The depth of this additional longitudinal slit is selectable by setting the height of the longitudinal slitting unit 32 and can extend to the inside of the wrapping foil 40.

With the closing strip applicator 34, a closing adhesive strip 45 pulled off roll 35 is then glued on next to the longitudinal slit 44. The closing strip is covered on the side of the longitudinal slit 44 opposite the glue-on side by a pull off strip 46 coming from roll 36.

Subsequently the extrusion 43 is cut in suitable lengths with the severing unit 37 for use as foam insulating tube. During the cutting operation the circular sawblade 38 follows the movement of the extrusion 43, in order that the latter can be produced continuously. After the cut, the sawblade returns to the starting position.

FIGS. 6 and 7 show the end product of the process described, namely the foam insulating tube ready for use. This insulating tube consists of the tubular foam core 42, which is covered externally by the wrapping foil 40 and internally by the core foil 41. The tubular foam body 42 is divided by the longitudinal slit 44 as well as by the longitudinal slit 47 aligned with the latter. The side faces of the longitudinal slit 44 are covered by the core foil 41. The side walls of the longitudinal slit 47, on the contrary, are exposed. The latter as has been mentioned, was produced by the longitudinal slitting unit 32. Instead of a longitudinal slitting unit, however, the core 22 might be provided on the side diametrically opposite the holding plate 23 with a web type extension which produces the slit 47 in the same manner as the holding plate 23 forms the slit 44. In this case, the side walls of the slit 47 would be lined by the core foil 41.

The closing adhesive strip 45 is glued directly onto the wrapping foil 40 on one side of the longitudinal slit 44 and parallel thereto. This half of the closing strip is marked 45a. The other half 45b of the closing strip is at first covered on the gluing side by the pull-off strip 46, which does not adhere on the wrapping foil 40. When the foam insulating tube has been slipped on a duct to be insulated, the pull-off strip is pulled off in the manner shown in FIG. 6 in the direction of the arrow E and at the same time a pressure in the direction of arrow F is exerted on the half 45b of the closing strip. By the pulling out of the pull-off strip 46, the sticky surface of the closing strip half 45b becomes free and adheres to the outside of the wrapping foil 40 due to the pressure exerted in direction F. The longitudinal slit 44 is thereby completely closed and the foam insulating tube secured and sealed at the duct to be insulated.

The invention is not limited to the example shown in the drawing. The described apparatus can serve also for the production of other wrapped foam bodies which can be produced continuously by the extrusion process. Notably foil-lined tubes may be produced for other than insulating purposes. Also foam bodies with full cross-section which are covered externally by a wrapping foil can be produced after removal of the core 22 and of the holding plate 23 from the mold channel 3. The mold block chains have proved an ideal means for the formation of a mold channel with moving outside walls.

All characteristics and process steps evident from the description and the drawing, including the structural details, may be essential to the invention in any combinations.

What is claimed is:

1. Apparatus for the production of a tube of foam material comprising in combination mold block drive means, a plurality of mold blocks each having a hemi-cylindrical mold surface connected to said drive means so that during at least a portion of their travel with said drive means pairs of mold blocks have their respective hemi-cylindrical mold surfaces in opposing relationship to form cylindrical moving molds, the portion of travel over which the cylindrical molds move defining a mold channel, means for feeding a first strip of flexible material into said mold channel adjacent the mold surface defined by the opposing surfaces of the mold blocks, means for feeding a foam material composition into said first flexible strip in said mold channel, a core member held fixed within said mold channel over which said foam composition material travels as it solidifies to form a tube of foam material having a hollow portion, and means for holding said core member in said mold channel comprising a member extending radially from said core member which forms a slit in the foam tube as it travels through the mold channel.

2. Apparatus according to claim 1 further comprising means for feeding a second strip of flexible material into said mold channel adjacent the wall of said core member and said holding means, said foam composition material being introduced into the apparatus between said first and second strips.

3. Apparatus as in claim 1 wherein said first and second strips of flexible material are of foil.

4. Apparatus according to claim 2 further including means for longitudinally slitting said foam tube on the interior of said tube opposite said slit formed by said holding meansfi, said slitting means being disposed at the exit end of said mold channel.

5. Apparatus according to claim 2 further including means for applying a closure strip to said tube, said closure strip applying means being disposed at the exit end of said channel.

References Cited

UNITED STATES PATENTS 3,182,864    8/1964    Pelley    18—43

J. SPENCER OVERHOLSER, Primary Examiner

M. O. SUTTON, Assistant Examiner

U.S. Cl. X.R.

18—14

PO-1050
(5/69)

UNITED STATES PATENT OFFICE
CERTIFICATE OF CORRECTION

Patent No. 3,585,678          Dated June 22, 1971

Inventor(s) P. Neumann et al

It is certified that error appears in the above-identified patent and that said Letters Patent are hereby corrected as shown below:

Col.
"    6, line 32, for "Core 2" read --Core 22--;
"    6, line 51, after "33" insert a period(.)

"    7, line 61, correct "slit 4" to --slit 44--.

Claim 4, line 4 of the claim, (col. 9) delete "fi".

Signed and sealed this 18th day of July 1972.

(SEAL)
Attest:

EDWARD M. FLETCHER, JR.        ROBERT GOTTSCHALK
Attesting Officer               Commissioner of Patents